US009604619B2

(12) United States Patent
Watanabe et al.

(10) Patent No.: US 9,604,619 B2
(45) Date of Patent: Mar. 28, 2017

(54) BRAKE CONTROL APPARATUS

(71) Applicant: Hitachi Automotive Systems, Ltd., Hitachinaka-shi, Ibaraki (JP)

(72) Inventors: Hirofumi Watanabe, Isesaki (JP); Daisuke Yasukawa, Hitachinaka (JP); Kazuhiko Nakano, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 400 days.

(21) Appl. No.: 14/177,349

(22) Filed: Feb. 11, 2014

(65) Prior Publication Data

US 2014/0283513 A1  Sep. 25, 2014

(30) Foreign Application Priority Data

Mar. 21, 2013  (JP) ................. 2013-058886

(51) Int. Cl.
*B60T 8/34* (2006.01)
*B60T 13/66* (2006.01)
*B60T 13/74* (2006.01)

(52) U.S. Cl.
CPC ............ *B60T 13/66* (2013.01); *B60T 13/745* (2013.01)

(58) Field of Classification Search
CPC ............................... B60T 13/66; B60T 13/745
USPC .................. 60/538; 303/113.3, 199
See application file for complete search history.

(56) References Cited

U.S. PATENT DOCUMENTS

| 4,998,781 A | 3/1991 | Kehl et al. |
| 2012/0073286 A1 | 3/2012 | Takayama et al. |
| 2013/0192222 A1* | 8/2013 | Nomura ................ B60T 8/4077 60/545 |

FOREIGN PATENT DOCUMENTS

| JP | 2-175373 A | 7/1990 |
| JP | 2010-234932 A | 10/2010 |
| JP | 2012-60805 A | 3/2012 |
| JP | 2012-71732 A | 4/2012 |

OTHER PUBLICATIONS

Japanese-language Office Action issued in counterpart Japanese Application No. 2013-058886 dated May 31, 2016 (3 pages).

\* cited by examiner

*Primary Examiner* — Thomas E Lazo
*Assistant Examiner* — Daniel Collins
(74) *Attorney, Agent, or Firm* — Crowell & Moring LLP

(57) ABSTRACT

A brake control apparatus includes a master cylinder configured to generate a brake pressure according to a depressing force of a brake pedal; an electric motor configured to operate the master cylinder; a control board configured to control the electric motor; and a board receiving portion arranged along an outer circumference of the master cylinder. The board receiving portion receives the control board such that a component-mounting surface of the control board faces in an axial direction of the master cylinder.

5 Claims, 18 Drawing Sheets

FIG. 5

BRAKE CONTROL APPARATUS

BACKGROUND OF THE INVENTION

The present invention relates to a brake control apparatus that controls an actuator applied to a brake system of a vehicle.

Each of Japanese Patent Application publication No. 2012-60805 (Patent Literature 1) and US Patent Application publication No. 2012/0073286 (corresponding to family Japanese Patent Application publication No. 2012-71732: Patent Literature 2) discloses a previously-proposed electric booster as the brake control apparatus for an actuator applied to a brake system.

In such an electric booster, a drive control device for controlling the actuator is provided at an upper end portion of a casing of the actuator. A bottom wall of the drive control device is formed in a concave shape conforming to a shape of the upper end portion of the casing of the actuator. Hence, a casing height of the electric booster itself with respect to an upper-lower direction is reduced to improve downsizing and layout flexibility of the electric booster.

SUMMARY OF THE INVENTION

In the previously-proposed brake control apparatus as above, the casing height of the brake control apparatus is reduced. However, a space around a master cylinder is not effectively used.

It is therefore an object of the present invention to provide a brake control apparatus devised to further downsize the brake control apparatus by effectively using the space around the master cylinder.

According to one aspect of the present invention, there is provided a brake control apparatus comprising: a master cylinder configured to generate a brake pressure according to a depressing force of a brake pedal; an electric motor configured to operate the master cylinder; a control board configured to control the electric motor; and a board receiving portion arranged along an outer circumference of the master cylinder, wherein the board receiving portion receives the control board such that a component-mounting surface of the control board faces in an axial direction of the master cylinder.

The other objects and features of this invention will become understood from the following description with reference to the accompanying drawings.

BRIEF DESCRIPTION OF DRAWINGS

FIG. 5 is a rear view of the brake control apparatus according to the embodiment, under a state so where a rear housing is removed.

DETAILED DESCRIPTION OF THE INVENTION

Hereinafter, embodiments according to the present invention will be explained in detail with reference to the drawings.

Example of Brake Control Apparatus

Figure 1:
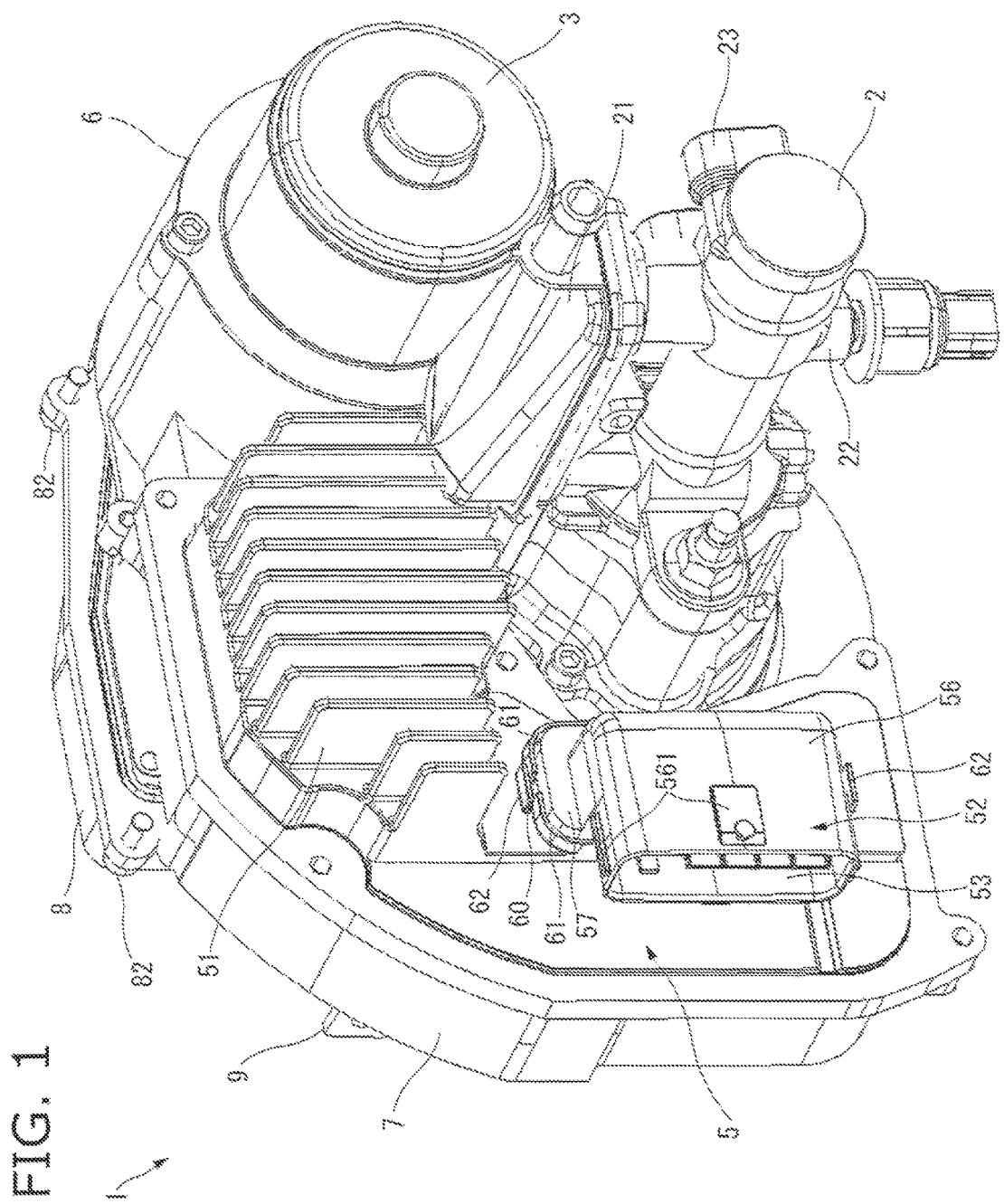
FIG. 1 is an oblique perspective view of a brake control apparatus according to an embodiment of the present invention.

A brake control apparatus 1 according to an embodiment of the present invention is shown in FIG. 1. The brake control apparatus 1 includes a master cylinder 2, an electric motor 3 and a board receiving portion (electrical control unit: ECU) 5. The master cylinder 2 generates a brake pressure according to a depressing force of a brake pedal (not shown). The electric motor 3 actuates or operates the master cylinder 2. The board receiving portion 5 accommodates or receives an after-mentioned control board (circuit board) 4 which controls the electric motor 3.

Figure 2:
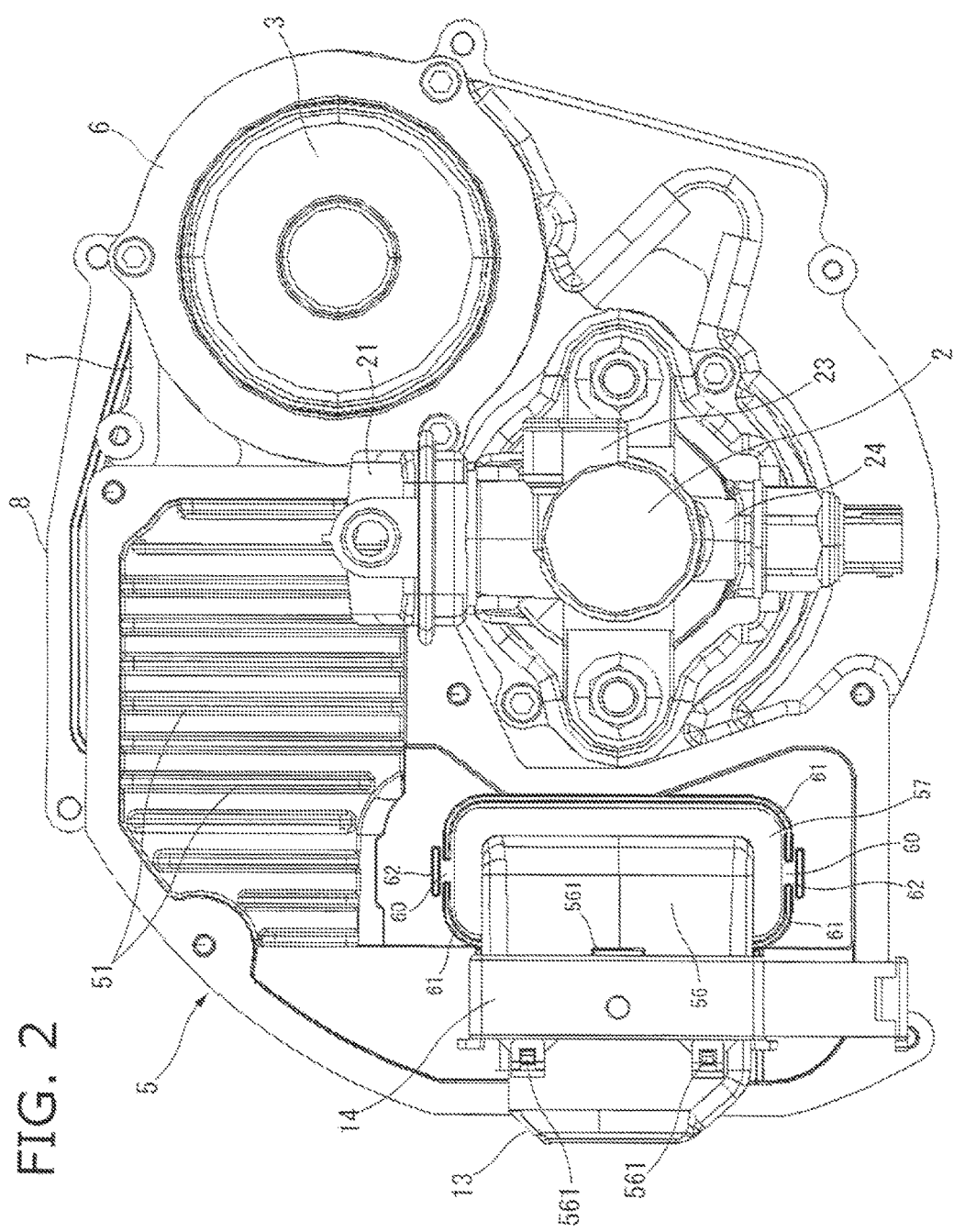
FIG. 2 is a front view of the brake control apparatus according to the embodiment.
Figure 3:
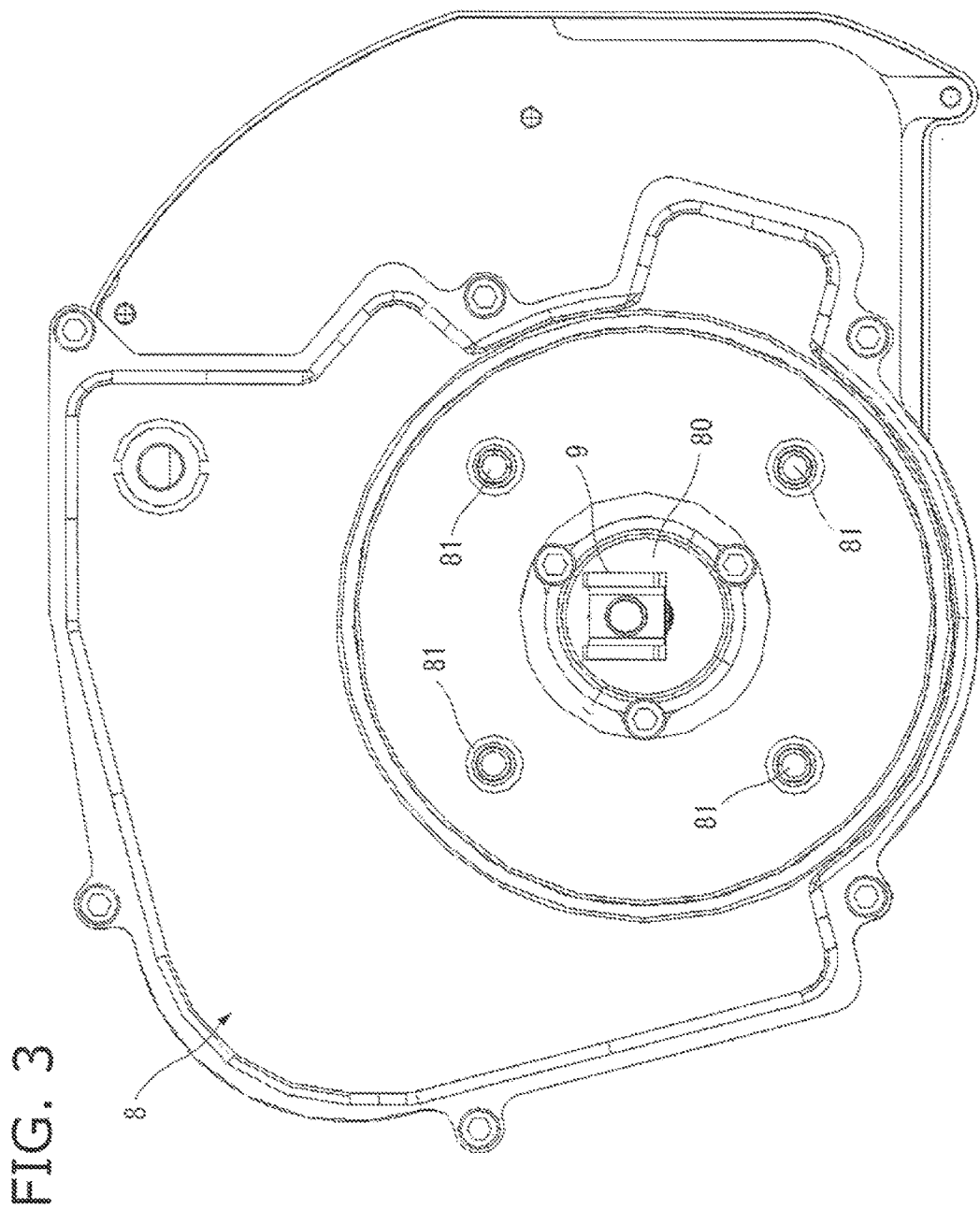
FIG. 3 is a rear view of the brake control apparatus according to the embodiment.

As shown in FIGS. 1 and 2, a front housing 7 is formed integrally with a motor housing 6. The motor housing 6 receives and accommodates the electric motor 3. The master cylinder 2 is fixed to the front housing 7 such that the master cylinder 2 is not coaxial to the electric motor 3, i.e. does not have the same axis as the electric motor 3. Moreover, a piston is disposed in the master cylinder 2. An input rod 9 connected with this piston is introduced outwardly from a rear-housing-side end portion of the master cylinder 2 which is located on the side of a rear housing 8, as shown in FIG. 3.

Figure 15:
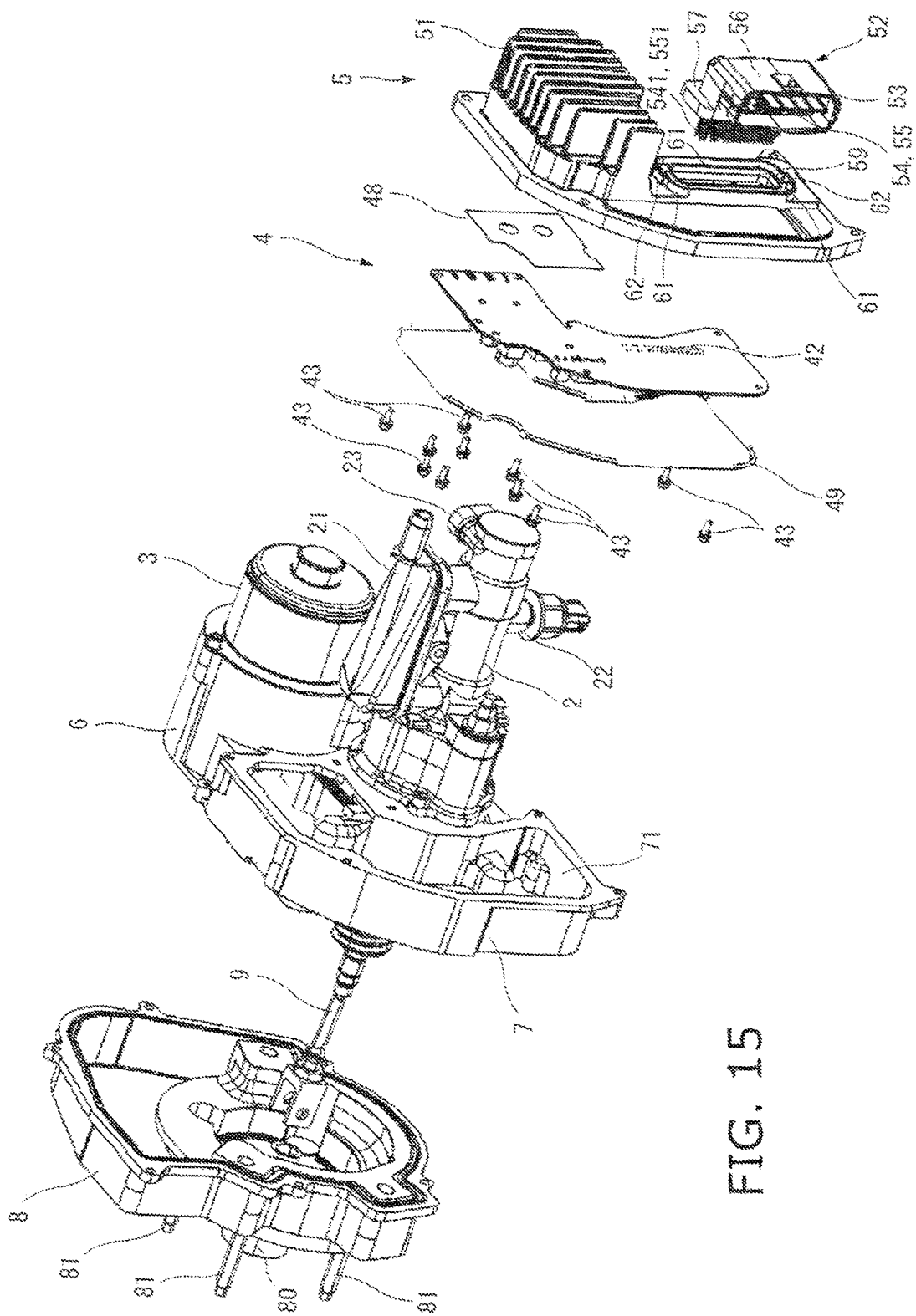
FIG. 15 is an exploded oblique perspective view of the brake control apparatus, as viewed from a front side thereof.
Figure 16:
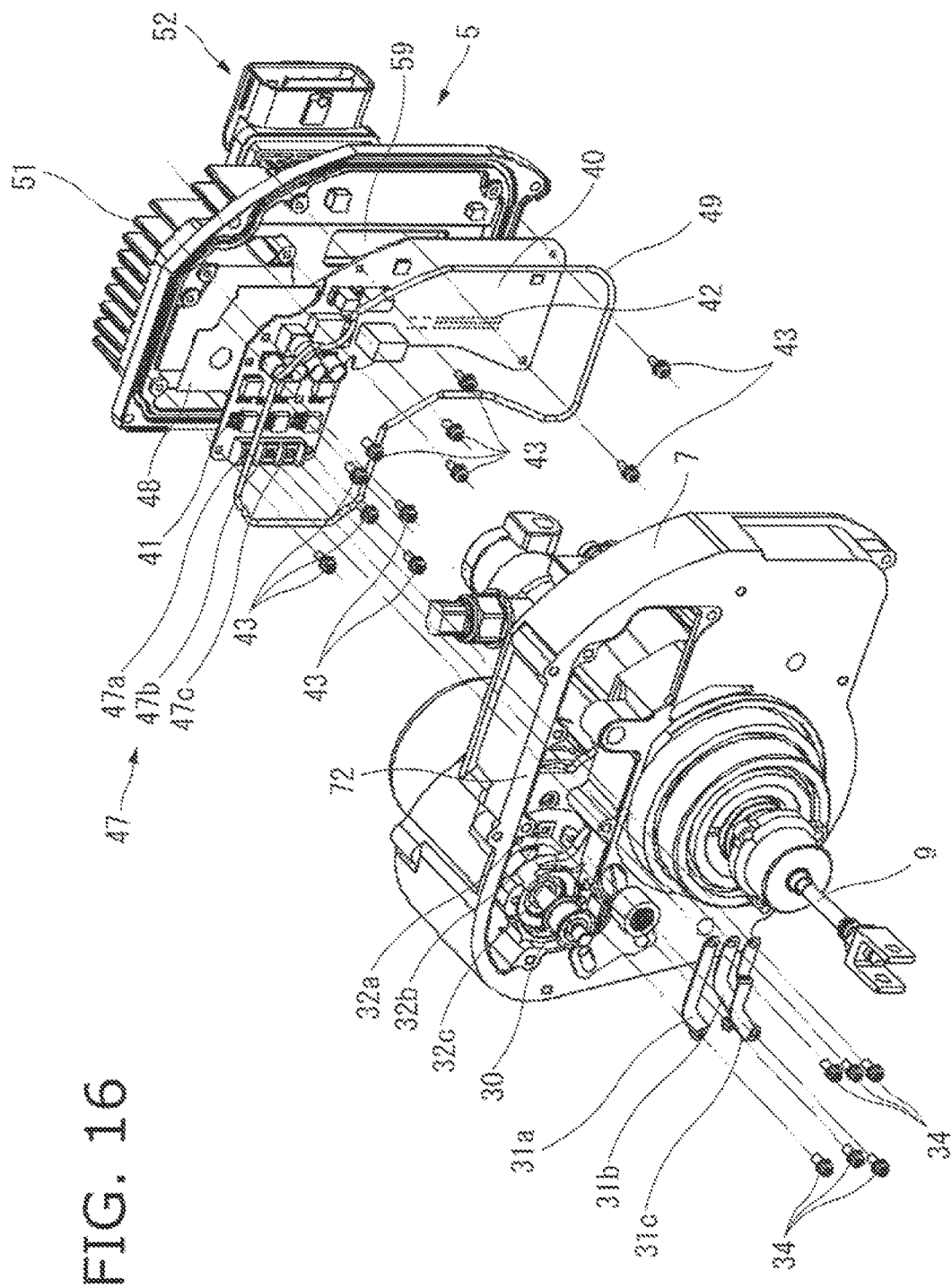
FIG. 16 is an exploded oblique perspective view of the brake control apparatus, as viewed from a rear side thereof.

As shown in FIG. 15, a front opening portion 71 is formed in a front portion of the front housing 7. A board receiving portion 5 to which the control board 4 has been attached is mounted in the front opening portion 71. On the other hand, as shown in FIG. 16, a rear opening portion 72 is formed in a rear portion of the front housing 7. After-mentioned bus bars (metal plates) 31a to 31c are attached to the electric motor 3 and the control board 4 via the rear opening portion 72. That is, as shown in FIG. 16, the operation for attaching the bus bars 31a to 31c to the electric motor 3 and the control board 4 is performed through the rear opening portion 72 from a rear direction of the brake control apparatus 1.

Figure 18:
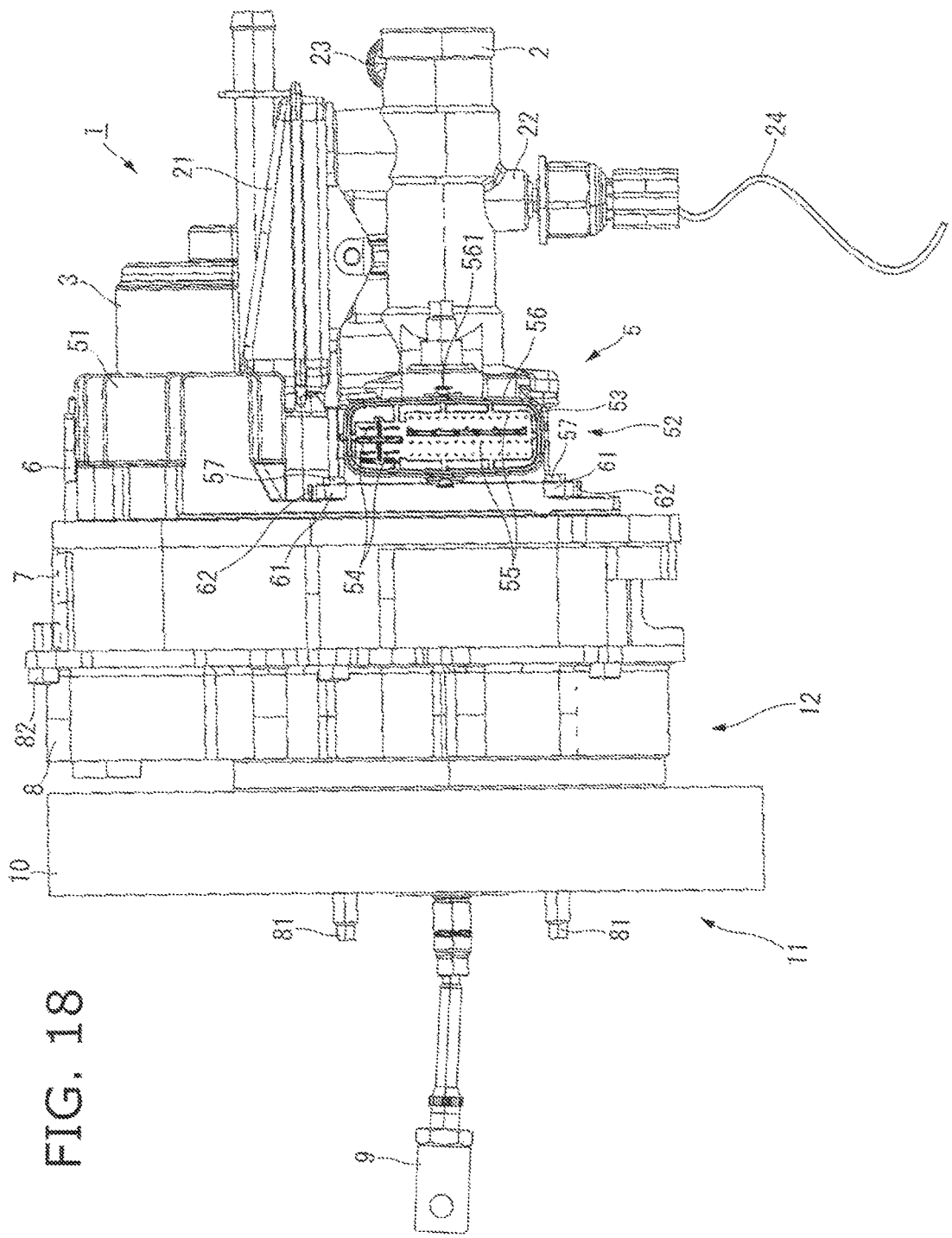
FIG. 18 is a lateral view of the brake control apparatus attached to a vehicle-body wall.

As shown in FIGS. 1 and 18, the rear housing 8 is attached to the motor housing 6 and the front housing 7. The rear housing 8 is attached (fastened) to a vehicle-body wall (firewall) 10. As shown in FIG. 3, the rear housing 8 includes a guide portion 80. By the guide portion 80, the input rod 9 connected with the piston in the master cylinder 2 is guided or introduced outwardly to the vehicle-body wall 10. Moreover, as shown in FIG. 15, a rear cover is fitted into the rear housing 8. In order to attach the rear housing 8 to the vehicle-body wall 10, bolts 81 are inserted into the rear cover.

The master cylinder 2 incorporates a known rotation-to-linear-motion conversion mechanism. By the rotation-to-linear-motion conversion mechanism, a rotational motion of a rotor 30 of the electric motor 3 which is produced by the depressing (manipulation) of the brake pedal is converted to a linear motion in an axial direction of the master cylinder 2. Thereby, the piston inside the master cylinder 2 is made to linearly move in the axial direction of the master cylinder 2. As the rotation-to-linear-motion conversion mechanism, for example, a roller-and-screw mechanism or a ball-and-screw mechanism as disclosed in the Patent Literature 2 may be adopted.

As shown in FIG. 1, the master cylinder 2 includes a hydraulic tank 21, an instrument piping portion 22 and a braking piping portion 23. The hydraulic tank 21 stores brake fluid with which the master cylinder 2 is filled or charged. As shown in FIG. 18, a pipe 24 connected with a pressure gauge (not shown) is attached to the instrument piping portion 22. A braking pressure (brake-fluid pressure) inside the master cylinder 2 which has been produced by the motion of the piston is discharged through the braking piping portion 23.

As shown in FIGS. 2 and 15, the board receiving portion 5 is arranged in an outer circumferential direction of the master cylinder 2. That is, a shape of the board receiving portion 5 is along an outer circumference of the master cylinder 2. The board receiving portion 5 accommodates or receives the control board 4 such that a component-mounting surface 40 of the control board 4 faces in the axial direction of the master cylinder 2. The component-mounting surface 40 of the control board 4 is set to face toward an attaching surface of the vehicle body at which the brake control apparatus 1 is mounted in the vehicle, i.e. to face toward an attaching surface of the vehicle-body wall 10 at which the rear housing 8 is attached to the vehicle-body wall 10.

Figure 4:
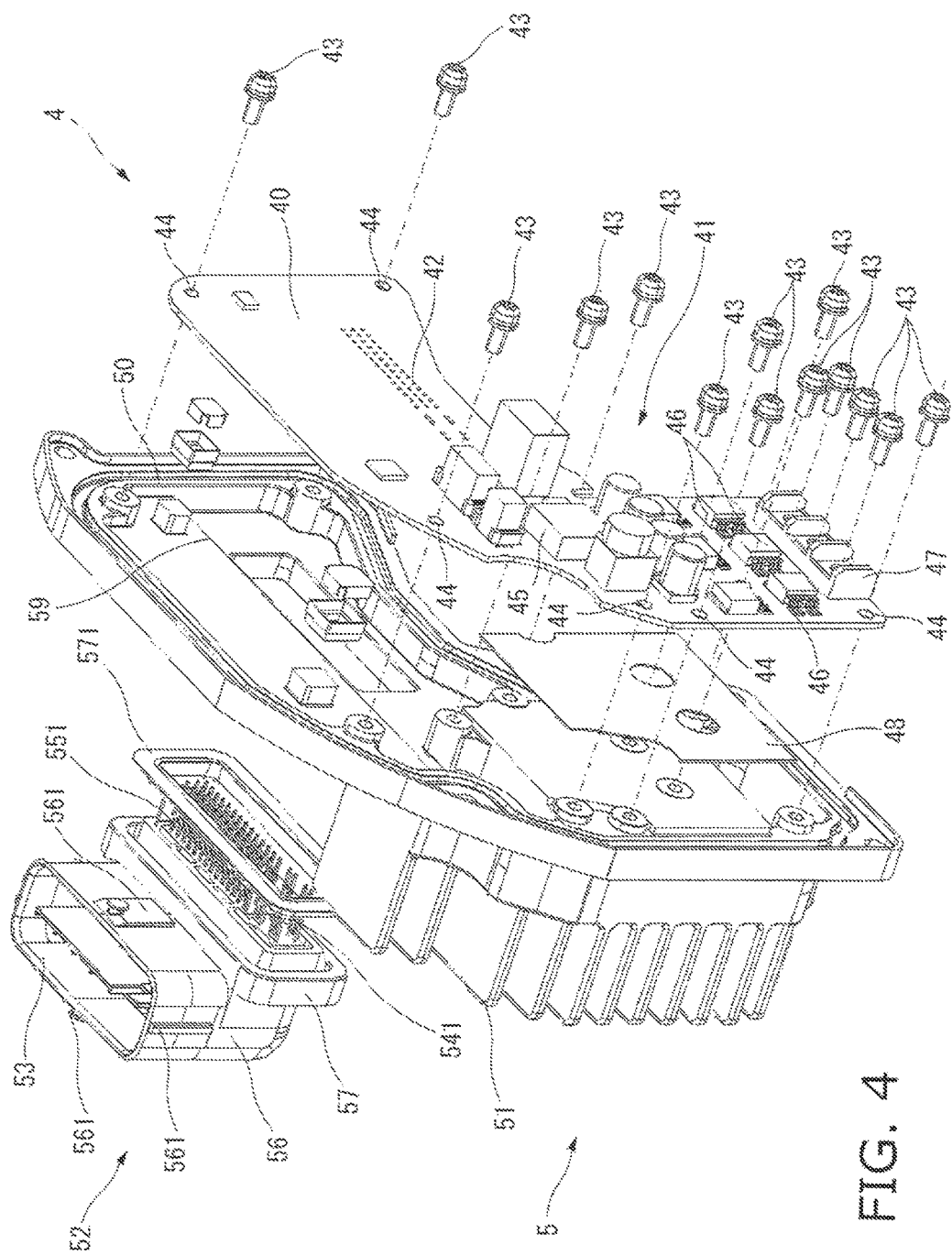
FIG. 4 is an exploded oblique perspective view of a board receiving portion provided in the brake control apparatus according to the embodiment.
Figure 5:
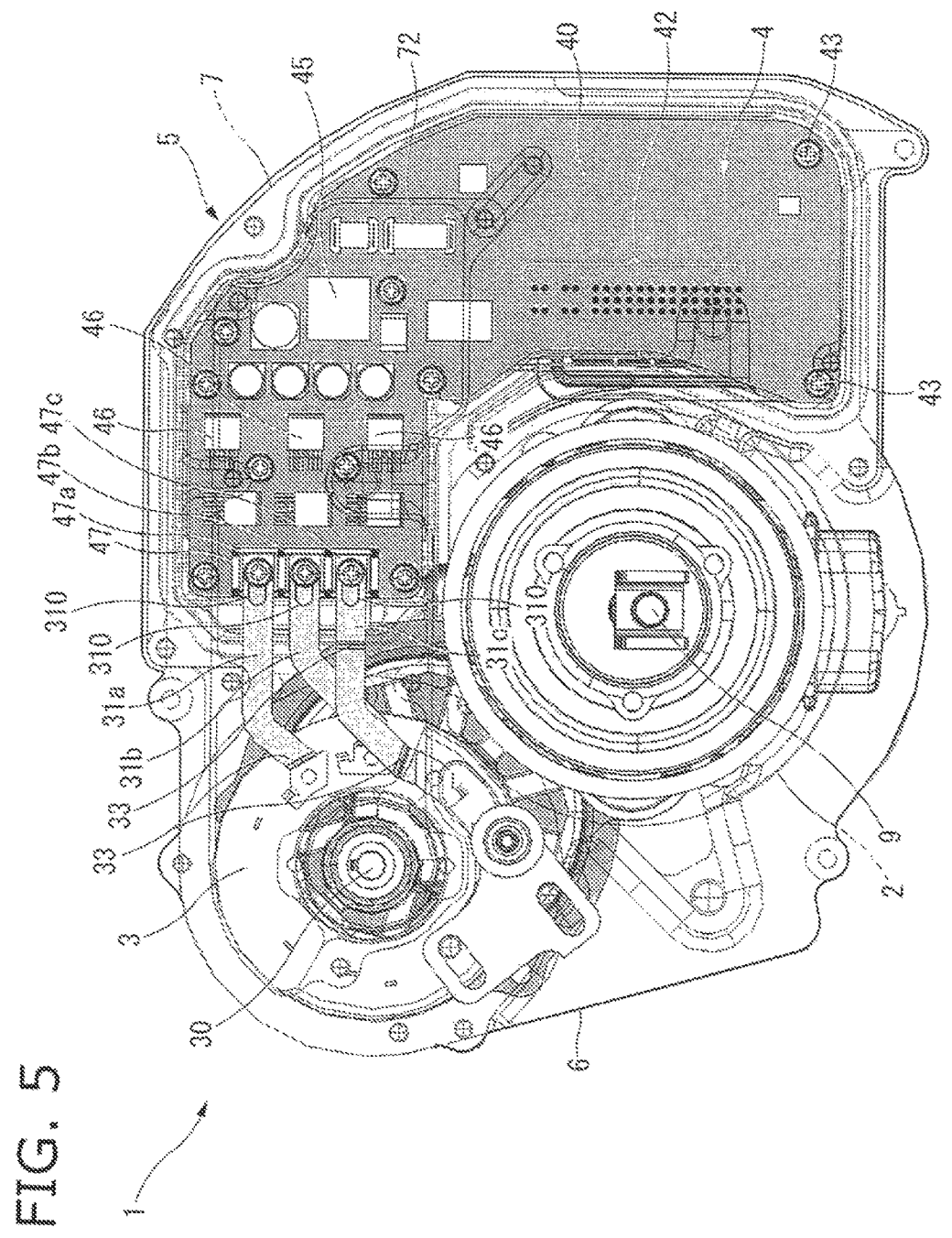

As shown in FIGS. 4 and 15, the control board 4 is made of a synthetic resin material, and is formed in a thin plate shape. The control board 4 has a shape bent along the circumferential direction (i.e., along the outer circumference) of the master cylinder 2, as viewed in the axial direction. That is, the control board 4 is formed in a substantially L-shape, as viewed in the axial direction. Moreover, as shown in FIG. 5, the control board 4 includes a main circuit 41 on the component-mounting surface 40. The main circuit 41 is located at a portion of the component-mounting surface 40 which is closer to the electric motor 3. That is, a distance between an after-mentioned connector portion 52 and the electric motor 3 is longer than a distance between the main circuit 41 and the electric motor 3.

As shown in FIG. 4, the control board 4 is formed with insertion holes 42. After-mentioned terminal pins 541 and 551 of power-supply terminals 54 and control terminals 55 of the connector portion 52 are inserted into the insertion holes 42, so that the power-supply terminals 54 and the control terminals 55 are electrically continuous with the main circuit 41. Moreover, the control board 4 is formed with fixing holes 44 near edge portions (corners) of the control board 4. Fixtures (locking tools) 43 are inserted respectively into the fixing holes 44 in order to fix the control board 4 to an opening portion 50 of the board receiving portion 5.

The main circuit 41 includes a control section 45, drive elements 46 and a conduction terminal 47. The control section 45 outputs control signals for the electric motor 3. The drive elements 46 output drive signals by receiving the control signals from the control section 45. The drive elements 46 are mounted at a location close to the electric motor 3 beyond the control section 45. That is, the drive elements 46 are located between the electric motor 3 and the control section 45. The conduction terminal 47 outputs the drive signals derived from the drive elements 46, to the electric motor 3. The conduction terminal 47 is mounted at a location close to the electric motor 3 beyond the drive elements 46. That is, the conduction terminal 47 is located between the electric motor 3 and the drive elements 46. Accordingly, the main circuit 41 functions as an inverter circuit for the electric motor 3.

In addition to the main circuit 41, a relay circuit(s), a MOSFET(s), a shunt resistor(s), a common-mode coil(s), a normal-mode coil(s), an electrolytic condenser(s) and the like which are components of a filter electronic circuit are mounted on the component-mounting surface 40 such that an electrical continuity between these components and the main circuit 41 can be established.

As shown in FIG. 5, the conduction terminal 47 of the main circuit 41 is (electrically) connected with the bus bars 31a to 31c which extend from the electric motor 3. Each of the bus bars 31a to 31c is a relay (link) bus bar. As shown in FIG. 16, one end side of each of the bus bars 31a to 31c is connected with a connecting terminal 32a to 32c of the electric motor 3, whereas another end side of each of the bus bars 31a to 31c is connected with a conducting portion 47a to 47c of the conduction terminal 47.

Each of the bus bars 31a to 31c is substantially formed in a dogleg shape (obtusely-bent shape), and has a proper entire length according to a positional relation between the conduction terminal 47 and the connecting terminal 32. Moreover, each of the bus bars 31a to 31c includes a spring portion(s) 33 appropriately. In the case shown in FIG. 5, each of the bus bars 31a and 31b is formed with the spring portion 33 located near one end portion of the bus bar 31a or 31b which is connected with the connecting terminal 32a or 32b. On the other hand, the bus bar 31c is formed with two spring portions 33. One of these two spring portions 33 is located near one end portion of the bus bar 31c which is connected with the connecting terminal 32c, whereas another of these two spring portions 33 is located closer to another end portion of the bus bar 31c which is connected with the conducting portion 47c (than to the one end portion).

Figure 6:
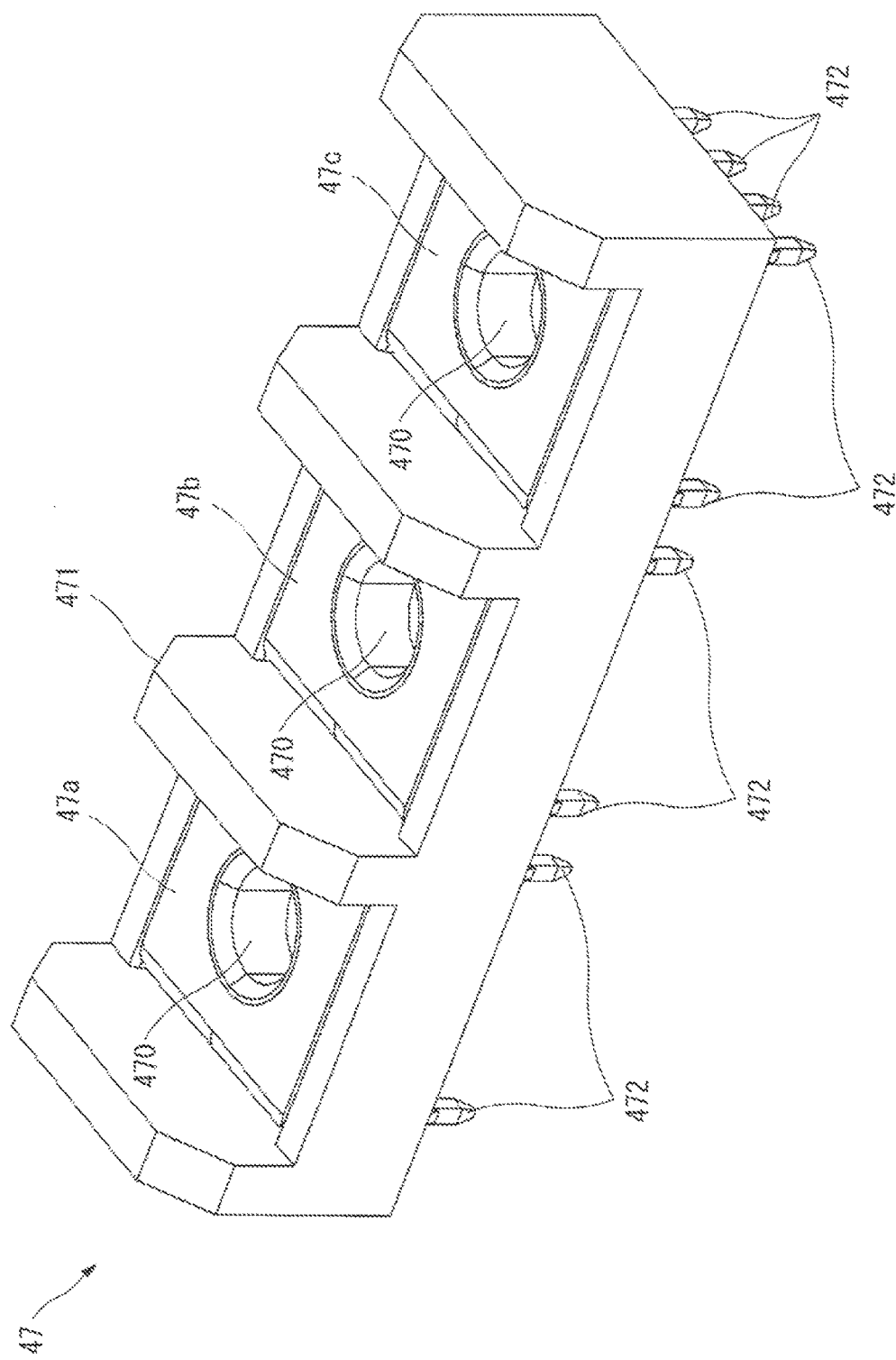
FIG. 6 is an oblique perspective view of a conduction terminal provided in the brake control apparatus according to the embodiment.

As shown in FIG. 6, the conduction terminal 47 includes the conducting portions 47a to 47c and a relay terminal block 471 made of resin. The conducting portions 47a to 47c are connected individually with the bus bars 31a to 31c. The relay terminal block 471 is disposed such that the conducting portions 47a to 47c are arranged in parallel with one another along an end portion of the component-mounting surface 40 which faces (is opposed to) an outer circumferential surface of the electric motor 3. That is, all of the conducting portions 47a to 47c are located on the end portion of the component-mounting surface 40, and face (the connecting terminals 32a to 32c of) the electric motor 3 in parallel with one another. The relay terminal block 471 supports the conducting portions 47a to 47c under the state where the conducting portions 47a to 47c are electrically insulated from one another. Terminal pins 472 are formed integrally with the conducting portions 47a to 47c. The terminal pins 472 are inserted and soldered into the component-mounting surface 40 of the control board 4 so as to secure an electrical continuity between the terminal pins 472 and the main circuit 41.

Moreover, each of the conducting portions 47a to 47c is formed with a first fixing hole 470. The fixtures (locking tools) 34 such as screws are inserted into the first fixing holes 470 of the conducting portions 47a to 47c in order to fasten the bus bars 31a to 31c to the conducting portions 47a to 47c.

On the other hand, as shown in FIG. 5, each of the bus bars 31a to 31c is formed with a second fixing hole 310 located at a connecting portion between the bus bar 31a to 31c and the conducting portion 47a to 47c. The second fixing hole 310 of each of the bus bars 31a to 31c is formed in an elongate shape (i.e., slotted-hole shape). An entire length of the elongate second fixing hole 310 in a longitudinal direction of the second fixing hole 310 is longer than a diameter of the first fixing hole 470, as viewed in the axial direction of the master cylinder 2.

As shown in FIG. 1, the board receiving portion 5 includes a plurality of heat-radiating fins 51 which radiate a heat of the control board 4. As shown in FIG. 4, the so heat-radiating fins 51 are provided at a location corresponding to the main circuit 41 of the control board 4, and protrude in the axial direction of the master cylinder 2. That is, the heat-radiating fins 51 are located to overlap with the main circuit 41 with respect to the axial direction of the master cylinder 2. Moreover, as shown in FIGS. 1 and 2, the heat-radiating fins 51 are located near (adjacent to) the electric motor 3 and in a space between the front housing 7 and the hydraulic tank 21.

As shown in FIG. 2, the board receiving portion 5 further includes the connector portion 52 which protrudes in the axial direction of the master cylinder 2. The connector portion 52 (electrically) connects a harness 13 with the control board 4 located inside the board receiving portion 5. The harness 13 is connected to an external peripheral equipment(s) (not shown). The connector portion 52 is provided inside an outer circumference (of a main frame) of the board receiving portion 5 with respect to a plane perpendicular to the axial direction of the master cylinder 2 (i.e., as viewed in the axial direction of the master cylinder 2). Moreover, the connector portion 52 is located near the master cylinder 2 and away from the electric motor 3. That is, the master cylinder 2 is located between the connector portion 52 and the electric motor 3, as viewed in the axial direction of the master cylinder 2.

As shown in FIG. 18, the power-supply terminals 54 and the control terminals 55 of the connector portion 52 are exposed to an opening portion 53 of the connector portion 52. This opening portion 53 of the connector portion 52 faces in a horizontal direction or in a direction so lower than the horizontal direction (with respect to a gravity direction) under a state where the brake control apparatus 1 has been fixed to the vehicle body. The power-supply terminals 54 and the control terminals 55 of the connector portion 52 are connected with the harness 13.

[Example of Board Receiving Portion]

A concrete example of the board receiving portion 5 will now be explained.

Figure 7:
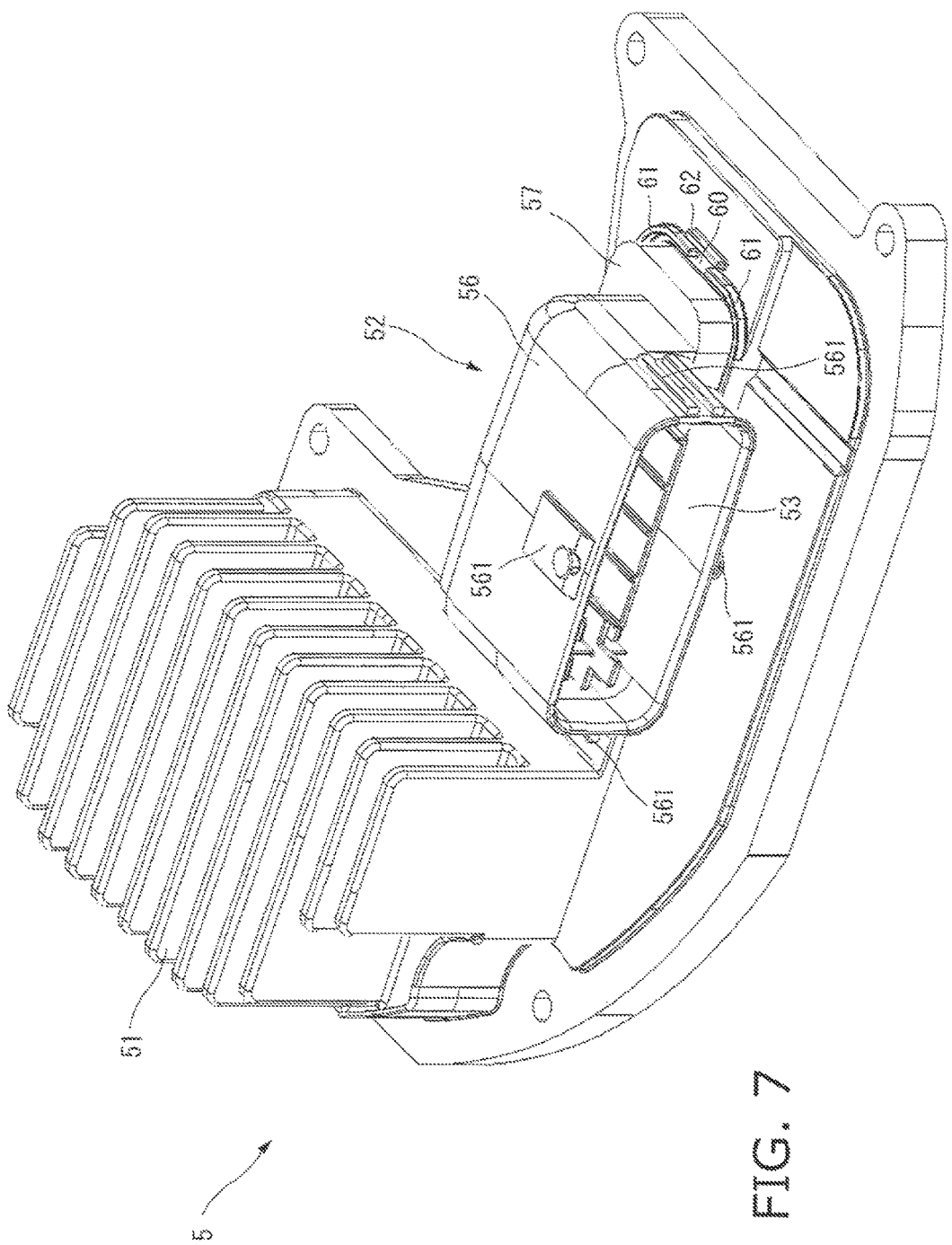
FIG. 7 is an oblique perspective view of the board receiving portion provided in the brake control apparatus according to the embodiment.

In an example of the board receiving portion 5 as shown in FIG. 7, the opening portion 53 of the connector portion 52 opens in a radial direction of the master cylinder 2 from a side of an end portion of the board receiving portion 5 which faces the master cylinder 2, i.e., opens in a direction from a master-cylinder-side end portion of the board receiving portion 5 toward the radial direction of the master cylinder 2.

Figure 8:
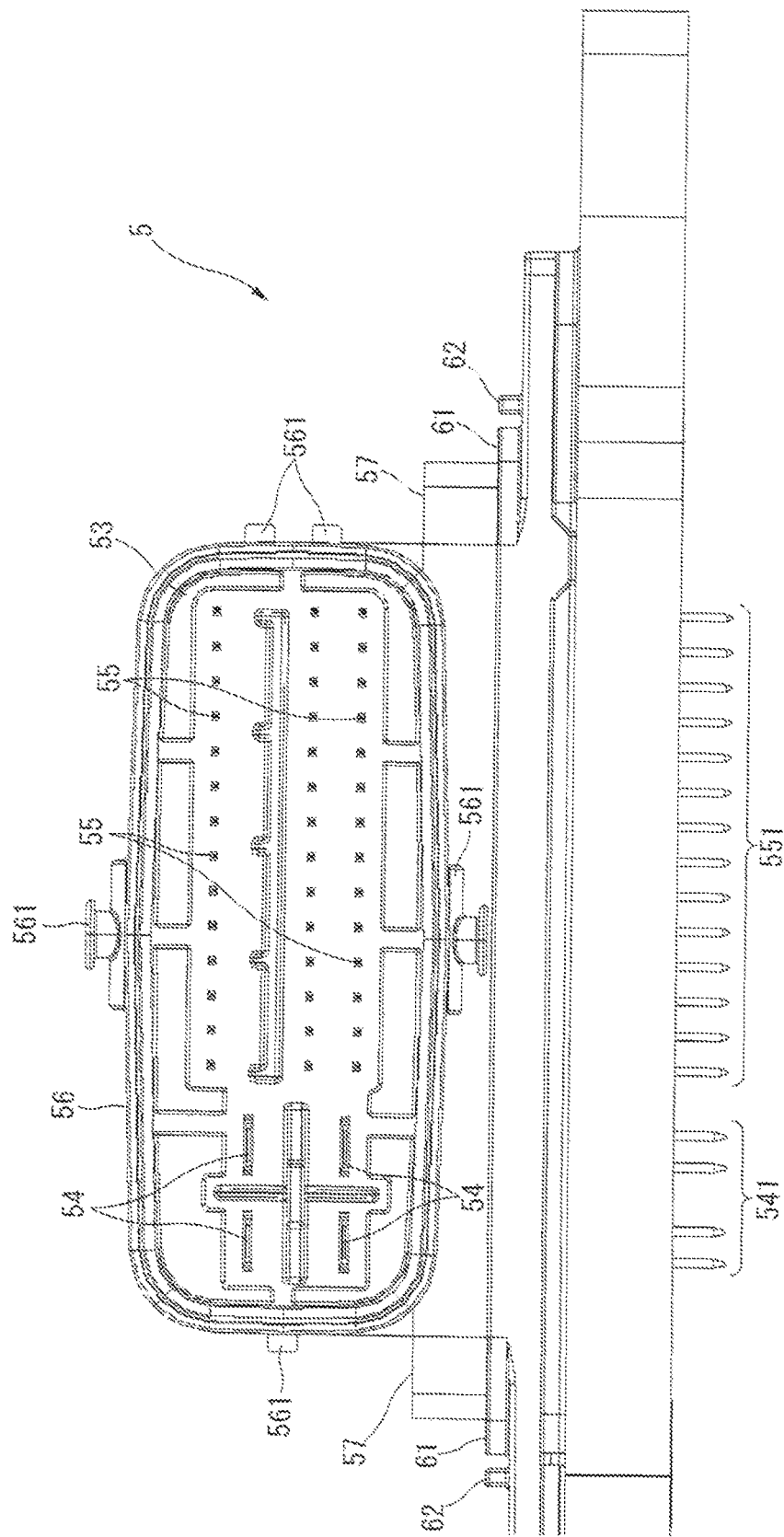
FIG. 8 is a front view of a connector portion provided to the board receiving portion.
Figure 9:
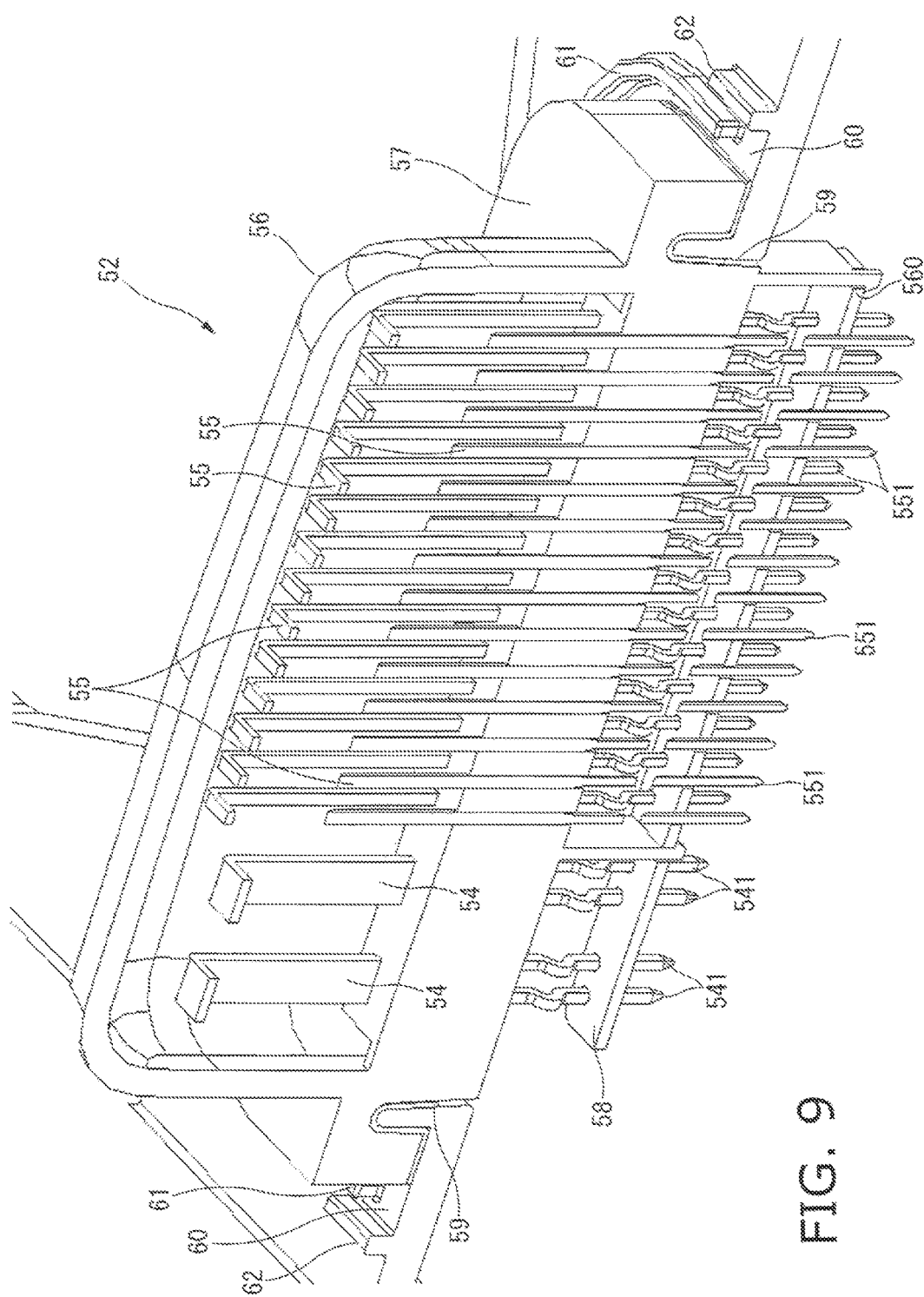
FIG. 9 is an oblique perspective view showing an inside of the connector portion.
Figure 10:
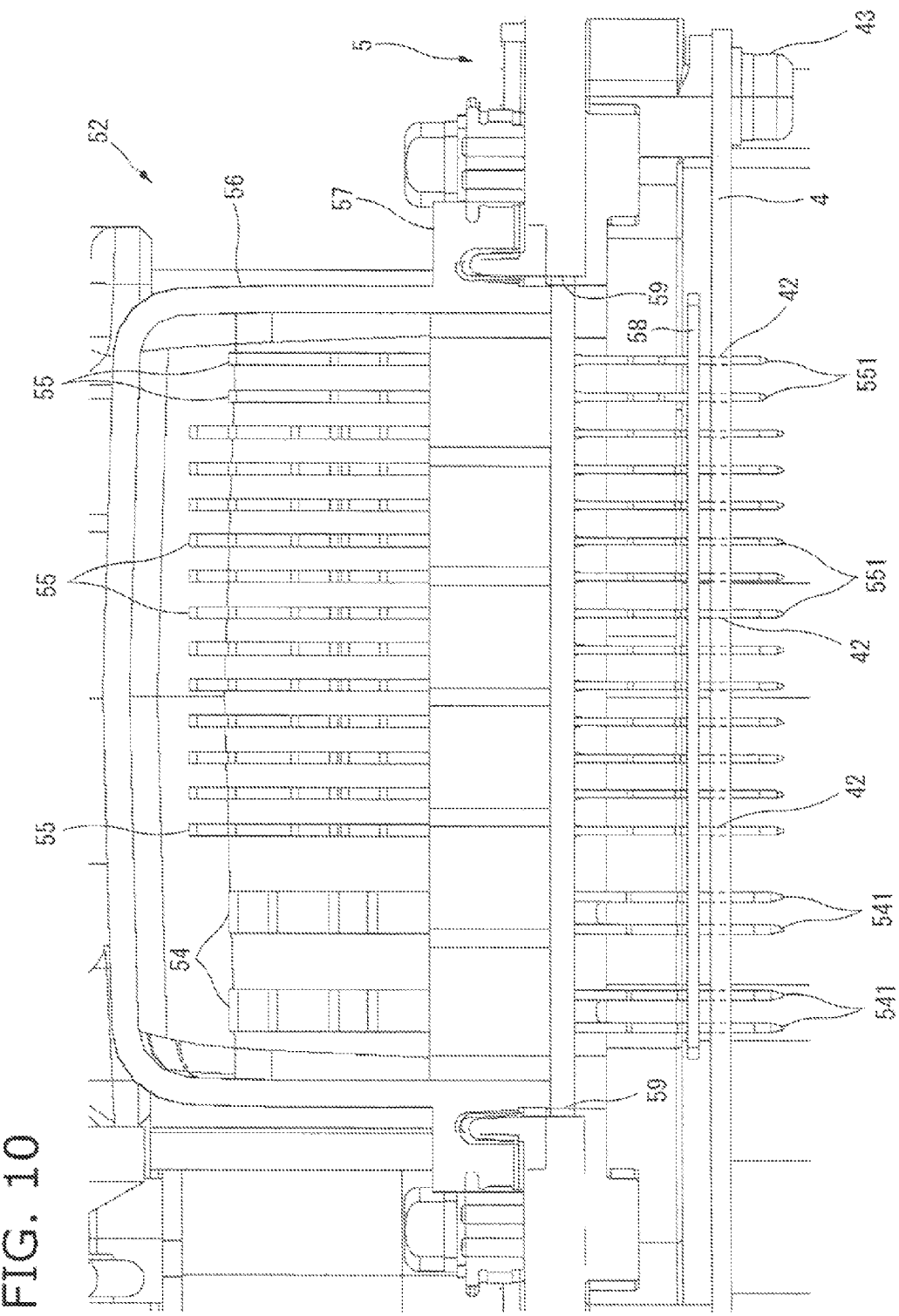
FIG. 10 is a vertical cross-sectional view of a front side of the connector portion.

As shown in FIGS. 8 to 10, the connector portion 52 includes a connector main-body portion 56, a flange portion 57 and a lower-end enclosing portion 58. The connector main-body portion 56 accommodates and supports the power-supply terminals 54 and the control terminals 55 which stand (extend) up from the control board 4. The connector main-body portion 56 is formed with the opening portion 53 which exposes one end of each of the power-supply terminals 54 and the control terminals 55 in the radial direction of the master cylinder 2. The flange portion 57 is formed integrally with an outer circumference of the connector main-body portion 56. The flange portion 57 is attached to the board receiving portion 5 by fitting the flange portion 57 with (into) a connector connecting port 59 of the board receiving portion 5. The lower-end enclosing portion 58 closes or seals a lower-end opening portion 560 of the connector main-body portion 56, and outwardly guides the terminal pins 541 and 551 of the power-supply terminals 54 and the control terminals 55 at regular intervals corresponding to an arrangement of the insertion holes 42 of the control board 4. As shown in FIG. 15, the connector connecting port 59 is located near (adjacent to) an edge portion of the board receiving portion 5 which faces the master cylinder 2. A longitudinal direction of the connector connecting port 59 is along the master-cylinder-side edge portion of the board receiving portion 5.

As shown in FIGS. 7 and 8, the connector main-body portion 56 includes a locking portion 561 which is located in an outer circumferential surface of the connector main-body portion 56 and near the opening portion 53. An interlocking tool 14 which interlocks the harness 13 shown in FIG. 2 with the connector main-body portion 56 is caught or latched by the locking portion 561.

As shown in FIG. 10, when the flange portion 57 of the connector portion 52 is attached and fitted to the connector connecting port 59 of the board receiving portion 5, the terminal pins 541 and 551 of the power-supply terminals 54 and the control terminals 55 are respectively inserted into the insertion holes 42 of the control board 4 fixed inside the board receiving portion 5, so that an electrical continuity between the main circuit 41 and the power-supply and control terminals 54 and 55 is established.

Figure 11:
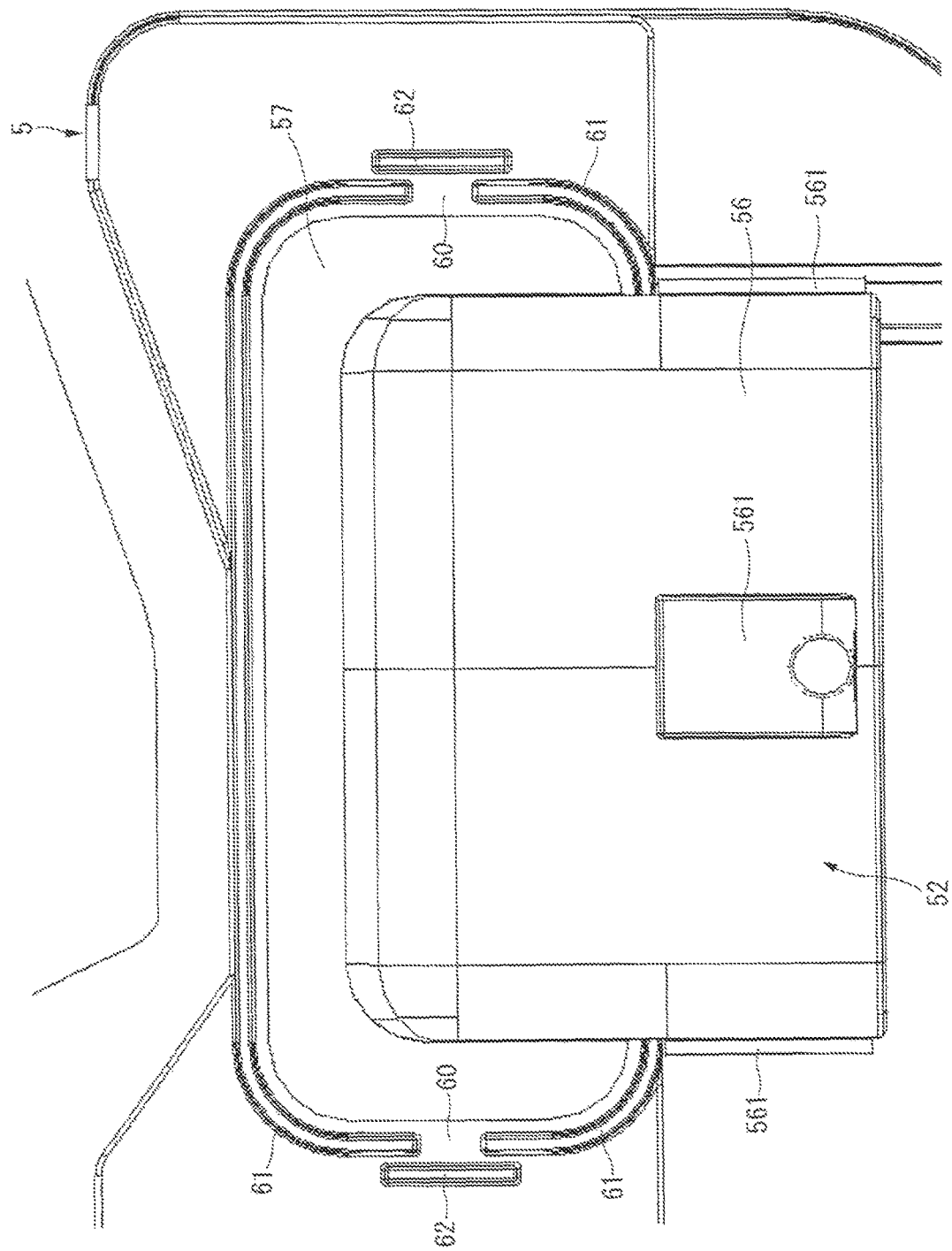
FIG. 11 is a top view of the connector portion.

As shown in FIGS. 11 and 15, a pair of erect walls (standing walls) 61 are formed around the connector connecting port 59 of the board receiving portion 5. The pair of erect walls 61 prevent liquid from entering the connector connecting port 59 from a surrounding region of the connector portion 52. A clearance 60 is secured between the pair of erect walls 61 at a location below the connector portion 52 when the brake control apparatus 1 has been fixed to the vehicle-body wall 10. Liquid such as a water which has been retained between the flange portion 57 of the connector portion 52 and the pair of erect walls 61 is drained through the clearance 60 by gravity force. Moreover, an erect wall (standing wall) 62 having its entire length longer than a width of the clearance 60 is formed is outside the clearance

60. In this example, as shown in FIG. 11, a pair of clearances 60 and a pair of erect walls 62 are provided near both ends of the connector connecting port 59 with respect to a longitudinal direction of the connector connecting port 59. This is because the liquid can be drained even if the brake control apparatus 1 is attached to the vehicle-body wall 10 under a state where the brake control apparatus 1 has been turned 180 degrees.

The arrangement of the connector portion 52 in the brake control apparatus 1 is not limited to the example shown in FIG. 7. According to the present invention, examples shown in FIGS. 12 to 14 may be adopted as the arrangement of the connector portion 52.

Figure 12:
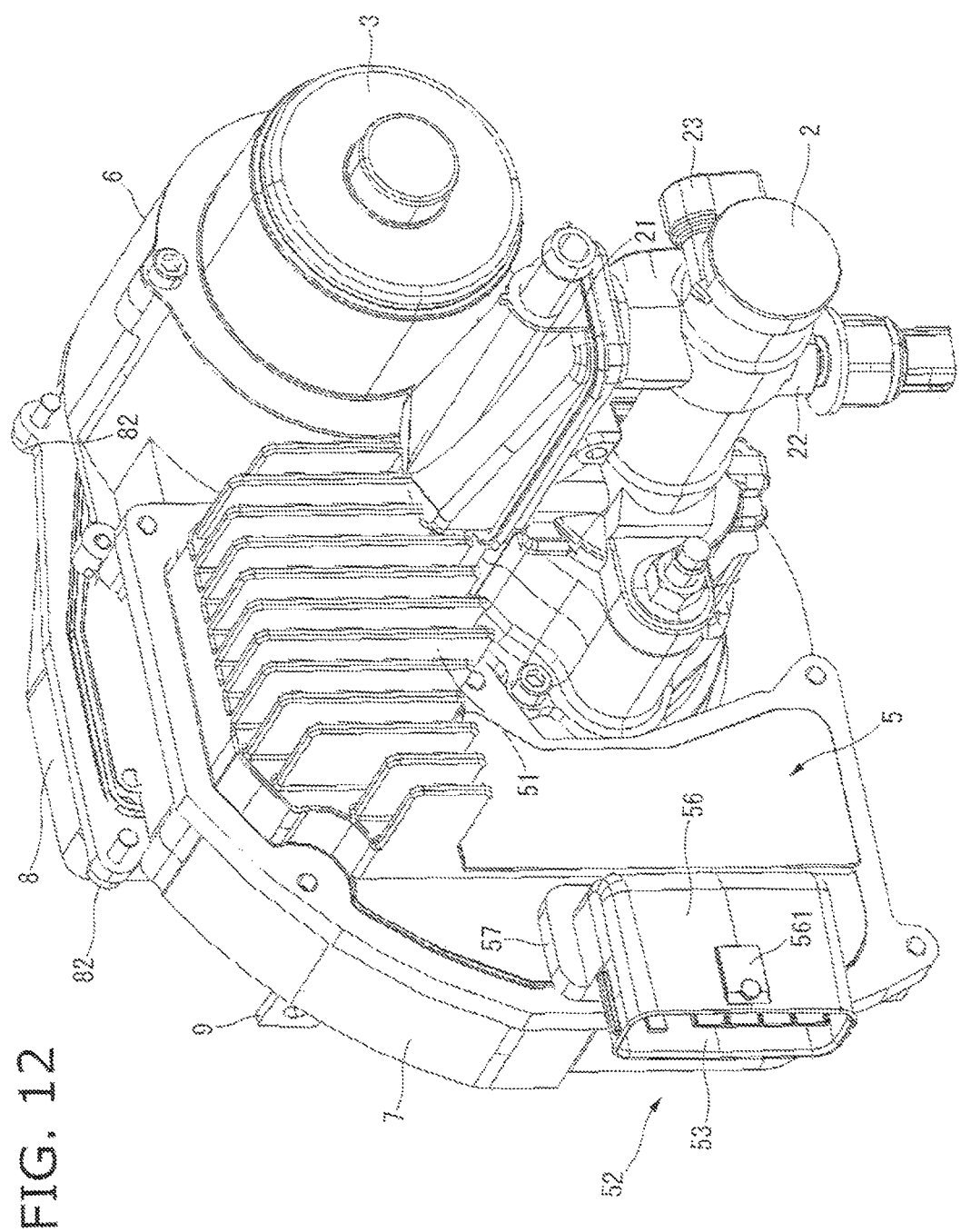
FIG. 12 is an oblique perspective view of the brake control apparatus in which a layout of the connector portion has been changed.

In the example shown in FIG. 12, the connector portion 52 of the board receiving portion 5 is located in an end portion of the board receiving portion 5 which is away from the master cylinder 2 in the radial direction of the master cylinder 2. That is, the connector portion 52 is located farthest from the master cylinder 2 and the electric motor 3. The opening portion 53 of the connector portion 52 opens in the radial direction of the master cylinder 2 under a state where the opening portion 53 (i.e., a part of the connector main-body portion 56) is located outside the outer circumference (of the main frame) of the board receiving portion 5 as viewed in the axial direction of the master cylinder 2. That is, the opening portion 53 protrudes from the outer circumference of the main frame of the board receiving portion 5 in the radial direction. According to this example, the harness 13 can be attached to the connector portion 52 from the radial direction of the master cylinder 2.

Figure 13:
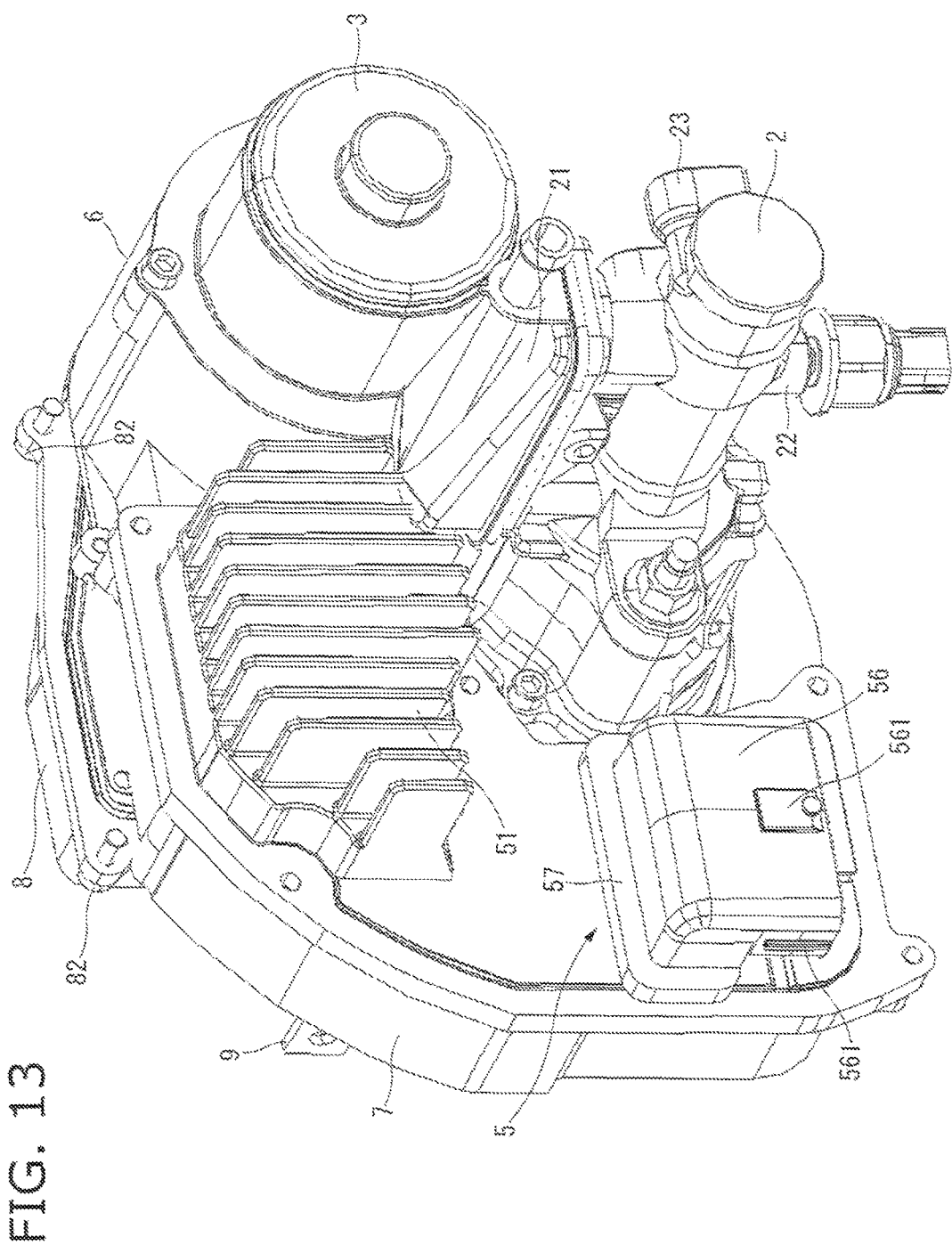
FIG. 13 is an oblique perspective view of the brake control apparatus in which the layout of the connector portion has been changed.

In the example shown in FIG. 13, the connector portion 52 of the board receiving portion 5 is disposed radially inside the outer circumference (of the main frame) of the board receiving portion 5 as viewed in the axial direction of the master cylinder 2. The opening portion 53 of the connector portion 52 opens in the radial direction of the master cylinder 2 and also in a direction from the heat-radiating fins 51 toward the master cylinder 2 or the connector portion 52. According to this example, the harness 13 can be attached to the connector portion 52 from the radial direction of the master cylinder 2.

Figure 14:
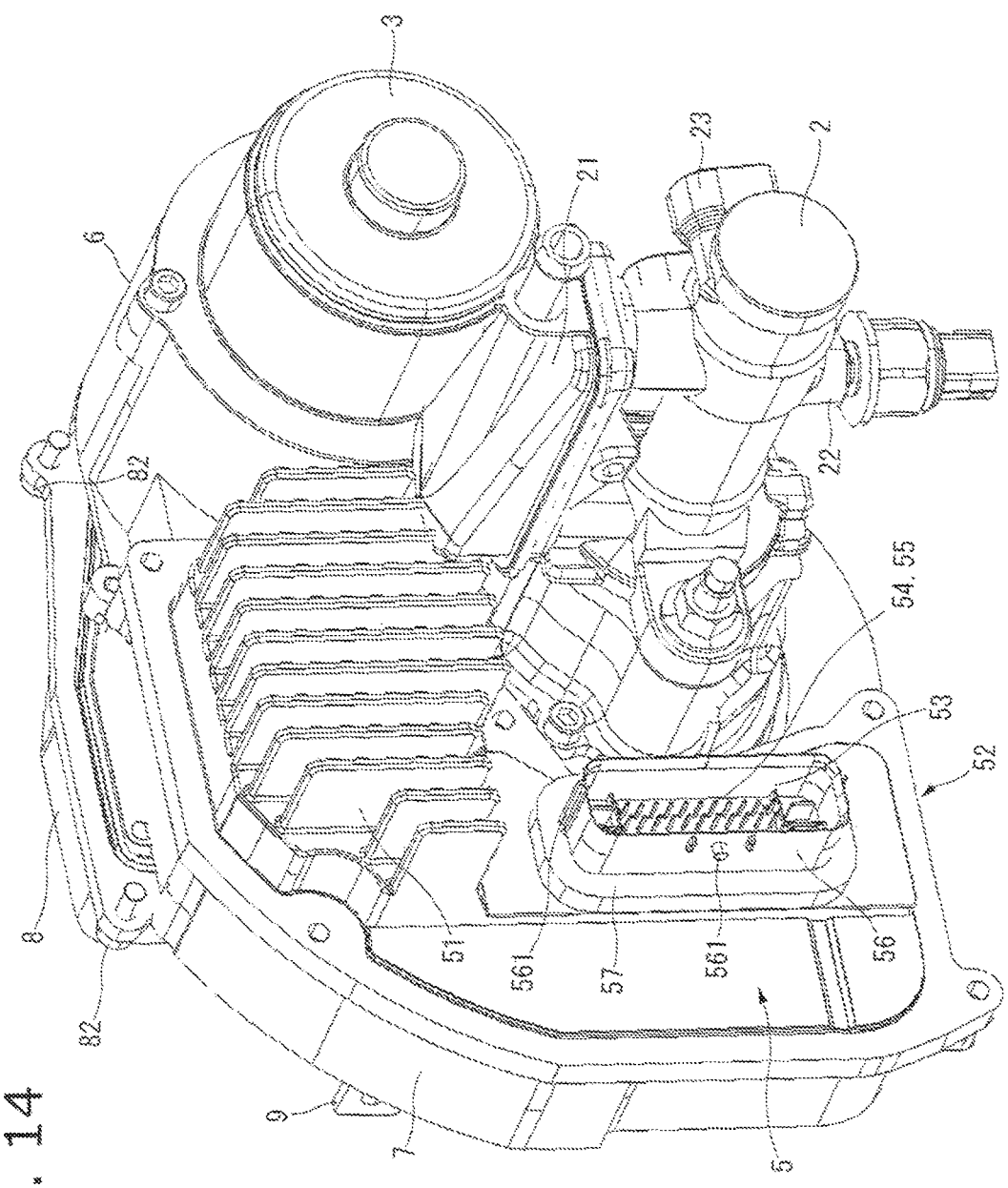
FIG. 14 is an oblique perspective view of the brake control apparatus in which the layout of the connector portion has been changed.

In the example shown in FIG. 14, the connector portion 52 of the board receiving portion 5 is located in an end portion of the board receiving portion 5 which faces (is opposed to) the master cylinder 2. The opening portion 53 of the connector portion 52 opens in the axial direction of the master cylinder 2 from a back surface side of the control board 4. According to this example, the harness 13 can be attached to the connector portion 52 from the axial direction of the master cylinder 2.

Around the connector portion 52 in each of FIGS. 12 to 14, the erect walls 61 and 62 and the clearance 60 are provided in the same manner as the example of FIG. 7, although these structures are not shown in FIGS. 12 to 14.

[Assembling Procedure of Brake Control Apparatus 1]

An example of an assembling procedure of the brake control apparatus 1 will now be explained referring to FIGS. 15 to 18.

The electric motor 3 and the master cylinder 2 are respectively attached and fixed to the motor housing 6 and the front housing 7, in advance. Moreover, the bus bars 31a to 31c are respectively connected and fixed to the connecting terminals 32a to 32c of the electric motor 3 by the fixtures 34.

On the other hand, the control board 4 including the component-mounting surface 40 on which the main circuit 41 and the above-mentioned filter electronic circuit and the like have been previously formed is fixed to the opening portion 50 of the board receiving portion 5 by the fixtures 43. An insulating member 48 is interposed between the board receiving portion 5 and the back surface of the control board 4, at a location corresponding to the main circuit 41. That is, the insulating member 48 is located to overlap with the main circuit 41 in the axial direction.

As shown in FIG. 4, the flange portion 57 of the connector portion 52 is fitted into the connector connecting port 59 of the board receiving portion 5 through a packing 571. Thereby, as shown in FIG. 10, the terminal pins 541 and 551 of the power-supply terminals 54 and the control terminals 55 of the connector portion 52 are inserted into the insertion holes 42 of the control board 4, so that the power-supply terminals 54 and the control terminals 55 are brought in electrical continuity with the main circuit 41 and the above-mentioned filter electronic circuit. Then, the insertion holes 42 are respectively soldered to the terminal pins 541 and 551 such that the connector portion 52 is fixed to the control board 4.

Next, as shown in FIGS. 15 and 16, the board receiving portion 5 to which the control board 4 and the connector portion 52 have been attached is placed into the front opening portion 71 of the front housing 7 through a packing 49, and is fastened to the front opening portion 71 of the front housing 7 by fixtures (not shown). At this time, as shown in FIGS. 5 and 16, a state where the conduction terminal 47 of the control board 4 has been arranged to substantially face the connecting terminals 32a to 32c provided on the side of the electric motor 3 can be viewed or checked via the rear opening portion 72 of the front housing 7.

Next, as shown in FIG. 5, the bus bars 31a to 31c extending from the side of the electric motor 3 toward the control board 4 are connected and fixed respectively to the conducting portions 47a to 47c of the conduction terminal 47 by the fixtures 34. This process is done via the rear opening portion 72 of the front housing 7.

Figure 17:
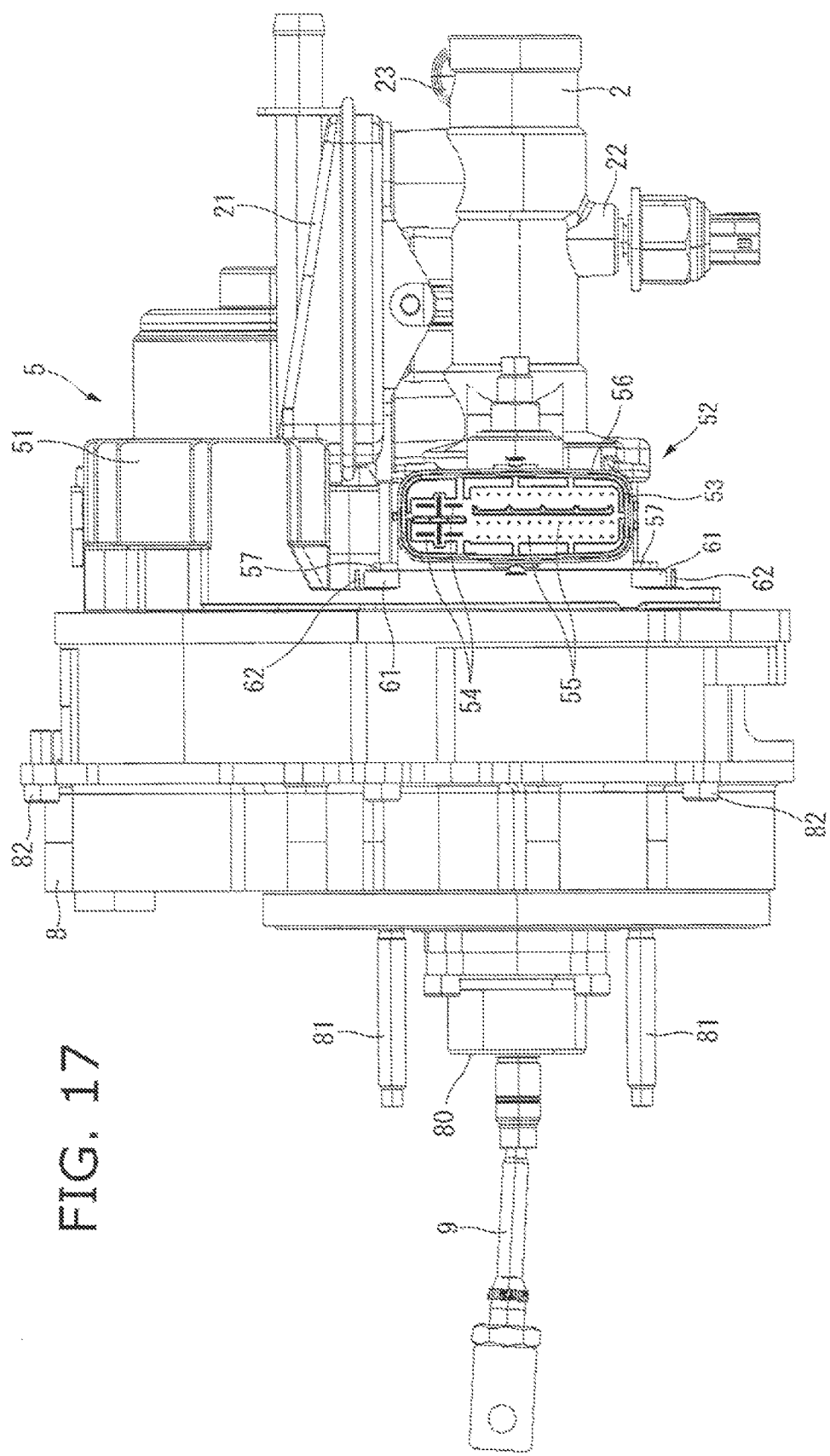
FIG. 17 is a lateral view of the brake control apparatus.

Then, as shown in FIG. 17, the rear housing 8 is attached and fixed to a back surface portion of the front housing 7 by fixtures 82, under a state where the input rod 9 of the master cylinder 2 is guided by the guide portion 80 and made to project from the guide portion 80.

As shown in FIG. 18, the brake control apparatus 1 which has been assembled as mentioned above is attached and fixed to the vehicle-body wall 10 by the bolts 81. At this time, the brake control apparatus 1 is placed on the vehicle-body wall 10 such that the opening portion 53 of the connector portion 52 opens in the horizontal direction or in a direction lower than the horizontal direction (with respect to gravity force).

One end of the input rod 9 which has been introduced though the vehicle-body wall 10 to a vehicle interior (driver room) 11 is attached to the brake pedal. On the other hand, in an engine room 12, the harness 13 is attached to the connector portion 52 of the brake control apparatus 1, and then fixedly connected with the connector portion 52 by the interlocking tool 14 as shown in FIG. 2. As shown in FIG. 18, the instrument piping portion 22 of the master cylinder 2 is connected with the pipe 24 leading to the pressure gauge whereas the braking piping portion 23 of the master cylinder 2 is connected with a pipe leading to a hydraulic control device.

Advantageous Effects According to Embodiments

In the brake control apparatus 1 as explained above, the board receiving portion 5 is disposed along the outer circumferential direction of the master cylinder 2, i.e. is formed in an L-shape as viewed in the axial direction of the master cylinder 2. Moreover, the board receiving portion 5 receives the control board 4 to cause the component-mounting surface 40 of the control board 4 to face in the axial direction of the master cylinder 2. Accordingly, an axial height of the board receiving portion 5 can be within the axially entire length of the master cylinder 2. That is, whole of the board receiving portion 5 can overlap with the master cylinder 2, as viewed from the radial direction of the master cylinder 2. Therefore, a downsizing of the brake control apparatus 1 is realized.

In particular, the control board 4 has the shape bent along the circumferential direction of the master cylinder 2. Accordingly, the control board 4 does not need to extend or protrude in the radial direction of the master cylinder 2 too much. Hence, the brake control apparatus 1 can be downsized in a peripheral region of the master cylinder 2, i.e. can be downsized with respect to the radial direction of the master cylinder 2. Moreover, even if an attitude in which the brake control apparatus 1 is attached to the vehicle body is changed (in its rotational direction about an axis of the input rod 9), a layout interference with rounding components and devices can be suppressed.

The component-mounting surface 40 of the control board 4 faces toward (i.e., is substantially parallel to) the attaching surface of the vehicle body at which the brake control apparatus 1 is mounted, i.e. faces toward the attaching surface of the vehicle-body wall 10 to which the rear housing 8 is attached. Accordingly, it becomes difficult for the control board 4 to be influenced by vehicle vibration so that a resonance of the control board 4 can be suppressed. Therefore, a lowering of durability of the circuit board (i.e., a degradation of joint parts such as solder joint) can be suppressed.

In the front housing 7, the master cylinder 2 is fastened such that the master cylinder 2 is not coaxial to the electric motor 3. Moreover, at least a part of the main circuit 41 of the control board 4 is located near (adjacent to) the electric motor 3 on the component-mounting surface 40. Accordingly, the heat-radiating fins 51 which function to radiate heat of the main circuit 41 of the control is board 4 can be disposed adjacent to both the master cylinder 2 and the electric motor 3. Hence, the heat-radiating fins 51 can be disposed in a dead space formed around the master cylinder 2. Therefore, a height of each of the heat-radiating fins 51 can be inhibited to a minimum degree from influencing a mounting layout (a mounting degree-of-freedom) of the brake control apparatus 1.

Moreover, since the heat-radiating fins 51 are located in the above-mentioned dead space, a heat of the electric motor 3 can be radiated through the heat-radiating fins 51 even if the heat of the electric motor 3 has been transmitted to the control board 4.

The main circuit 41 of the control board 4 is provided near (adjacent to) the electric motor 3 whereas the connector portion 52 of the board receiving portion 5 is connected with the end portion of the control board 4 which is away from the electric motor 3. According to this embodiment, a connection distance between the main circuit 41 of the control board 4 and the electric motor 3 can be shortened. Moreover, an equalization in length of each phase for the electric motor 3 becomes easy. Additionally, the filter circuit and the main circuit (e.g., inverter circuit) can be serially arranged in this order from the side of the connector portion 52, on the control board 4. Thereby, a wiring can become easy.

The connector portion 52 protrudes from (the main frame of) the board receiving portion 5 in the axial direction of the master cylinder 2. Accordingly, the height of the connector portion 52 can be within the axially entire length of the master cylinder 2. That is, whole of the connector portion 52 can overlap with the master cylinder 2, as viewed from the radial direction of the master cylinder 2. Therefore, the brake control apparatus 1 can be downsized.

Moreover, the connector portion 52 is provided at a location which is near (adjacent to) the master cylinder 2 and away from the electric motor 3. That is, a distance between the connector portion 52 and the master cylinder 2 is shorter than a distance between the connector portion 52 and the electric motor 3. The connector portion 52 is located on a side opposite to the brake pedal through the front housing 7 and the rear housing 8. Additionally, the master cylinder 2 protrudes from the front housing 7, near the connector portion 52. Accordingly, the space (dead space) around the master cylinder 2 can be effectively used, so that the attachment between the connector portion 52 and the harness 13 is easy.

The brake control apparatus 1 is attached to the vehicle-body wall 10 in such a manner that the opening portion 53 of the connector portion 52 opens in the horizontal direction or in a direction lower than the horizontal direction. Accordingly, liquid such as moisture that exists on a surface of the connector portion 52 naturally flows down along the surface of the connector portion 52. Therefore, the liquid such as moisture can be inhibited from going into the connector portion 52.

As shown in FIG. 7, the connector portion 52 is located inside the outer circumferential surface (of the main frame) of the board receiving portion 5 as viewed in the axial direction of the master cylinder 2. Accordingly, a projected area of a main body of the brake control apparatus 1 in the axial direction can be reduced, so that an upsizing of the brake control apparatus 1 can be suppressed. Additionally, a fitting space between the connector portion 52 and the harness 13 can be located inside the outer circumferential surface (of the main frame) of the board receiving portion 5 as viewed in the axial direction.

The pair of erect walls 61 standing at (protruding from) a surrounding region of the connector connecting port 59 are provided to the board receiving portion 5. Accordingly, liquid (moisture) is prevented from entering the connector connecting port 59 through the surrounding region of the connector connecting port 59.

The clearance 60 is secured between the erect walls 61 at a location which is below the connector portion 52 when the brake control apparatus 1 has been fixed to the vehicle-body wall 10. Since the clearance 60 is located below the connector portion 52 when the brake control apparatus 1 has been fixed to the vehicle-body wall 10, liquid (moisture) existing between the connector portion 52 and the erect wall 61 can be naturally removed through the clearance 60 by gravity.

At an electric-motor-side portion of the component-mounting surface 40 of the control board 4, the bus bars 31a to 31c provided to extend from the electric motor 3 are connected with the conduction terminal 47 under the state where the board receiving portion 5 receiving the control board 4 has been attached to the front housing 7. Thus, a work of connecting the bus bars 31a to 31c with the control board 4 can be performed from is the axial direction of the master cylinder 2. Hence, an assembling performance is improved because the connecting work between the bus bars 31a to 31c and the control board 4 can be performed from the attaching direction between the control board 4 and the front housing 7. Moreover, because the bus bars 31a to 31c are connected with the conduction terminal 47 on the component-mounting surface 40, the connecting portions of the bus bars 31a to 31c reinforce the control board 4. Hence, when the control board 4 vibrates, a deflecting deformation of the control board 4 can be suppressed.

The conduction terminal 47 is constituted by the conducting portions 47a to 47c and the relay terminal block 471. The conducting portions 47a to 47c are connected with the bus bars 31a to 31c. The relay terminal block 471 is disposed such that the conducting portions 47a to 47c are aligned along an edge line of the component-mounting surface 40 which faces (is opposed to) the outer circumferential surface of the electric motor 3. The relay terminal block 471 supports the conducting portions 47a to 47c under the state where the conducting portions 47a to 47c are electrically insulated from one another. Such a conduction terminal 47 is fixed to the component-mounting surface 40 of the control board 4. Hence, the deflection of the control board 4 due to vibrations can be suppressed. In addition, because the conducting portions 47a to 47c are provided in parallel with one another and opposed to the electric motor 3, a length equalization of the bus bars 31a to 31c and a length equalization between the drive elements 46 and the conduction terminal 47 can be attained.

Each of the bus bars 31a to 31c is formed with the second fixing hole 310 having an elongate-hole shape. The longitudinal length (maximum diameter) of the second fixing hole 310 is larger than the diameter of the first fixing hole 470 of the conducting portion 47a to 47c. The fixtures 34 are passed through the second fixing holes 310 so as to fasten the bus bars 31a to 31c to the conducting portions 47a to 47c of the conduction terminal 47. According to this embodiment, even if positional variations (deviations) between the first fixing hole 470 and the second fixing hole 310 are caused when the control board 4 is attached to the front housing 7, the bus bars 31a to 31c can be connected and fixed to the conducting portions 47a to 47c by absorbing the positional variations between the first fixing so hole 470 and the second fixing hole 310. Therefore, the assembling performance is improved when the board receiving portion 5 receiving the control board 4 is attached to the front housing 7.

One end side of each of the bus bars 31a to 31c is connected with the connecting terminal 32a to 32c of the electric motor 3 whereas another end side of each of the bus bars 31a to 31c is connected with the conduction terminal 47 of the control board 4. Thus, each bus bar 31a to 31c functions as a relay bus bar (linking bus bar). According to this embodiment, even in a case that the conduction terminal 47 provided on the side of the control board 4 cannot be linearly connected with the connecting terminals 32a to 32c provided on the side of the electric motor 3 when the electric motor 3 and the board receiving portion 5 have been attached to the front housing 7, i.e. even in a case that a facing direction and/or height of the conduction terminal 47 are different from those of the connecting terminals 32a to 32c; the shape of each of the relay bus bars 31a to 31c has only to be changed. Therefore, a mounting-layout change of the control board 4 or a structure change of the electric motor 3 can be suppressed, so that the brake control apparatus 1 is widely applicable.

Each of the bus bars 31a to 31c is formed with the spring portion(s) 33, and hence is stretchable. Therefore, the bus bars 31a to 31c can establish the electrical continuity between the conduction terminal 47 and the connecting terminals 32a to 32c by flexibly matching a positional relation between the conduction terminal 47 and the connecting terminals 32a to 32c. In addition, the deflecting deformation of the control board 4 can be further suppressed when the control board 4 vibrates.

A distance between a mounting location of the control section 45 and a mounting location of the drive elements 46 is shorter than a distance between and the electric motor 3 and the mounting location of the control section 45, on the component-mounting surface 40 of the control board 4. That is, the drive elements 46 are located between the control section 45 and the electric motor 3, on the component-mounting surface 40. Moreover, a distance between the conduction terminal 47 and the mounting location of the drive elements 46 is shorter than a distance between the electric motor 3 and the mounting location of the drive elements 46. That is, the conduction terminal 47 is located between the drive elements 46 and the electric motor 3. According to this embodiment, the conduction terminal 47 can be joined to the bus bars 31a to 31c at the location between the electric motor 3 and the drive elements 46 at a location away from the control section 45). Hence, a heat generated in the drive elements 46 is transmitted through the bus bars 31a to 31c to the electric motor 3, and then is radiated to the front housing 7. Therefore, the heat can be inhibited from influencing the control section 45.

Although the invention has been described above with reference to certain embodiments of the invention, the invention is not limited to the embodiments described above. Modifications and variations of the embodiments described above will occur to those skilled in the art in light of the above teachings.

This application is based on a prior Japanese Patent Application No. 2013-58886 filed on Mar. 21, 2013. The entire contents of this Japanese Patent Application are hereby incorporated by reference.

The scope of the invention is defined with reference to the following claims.

What is claimed is:

1. A brake control apparatus comprising:
a master cylinder configured to generate a brake pressure according to a depressing force of a brake pedal;
an electric motor configured to operate the master cylinder;
a control board configured to control the electric motor; and
a board receiving portion arranged along an outer circumference of the master cylinder, wherein the board receiving portion receives the control board such that a component-mounting surface of the control board faces in an axial direction of the master cylinder,
wherein the control board has a shape bent along a circumferential direction of the master cylinder.

2. The brake control apparatus as claimed in claim 1, wherein the component-mounting surface is opposed to an attaching surface to which the brake control apparatus is attached in a vehicle.

3. The brake control apparatus as claimed in claim 1, wherein the master cylinder is fastened to be non-coaxial to the electric motor, and a main circuit of the control board is located on the component-mounting surface and near the electric motor.

4. The brake control apparatus as claimed in claim 3, wherein the board receiving portion includes heat-radiating fins configured to radiate a heat of the control board, and the heat-radiating fins are located adjacent to the electric motor and between a hydraulic tank of the master cylinder and a housing to which the master cylinder is fixed.

5. The brake control apparatus as claimed in claim 3, wherein the main circuit of the control board is located near the electric motor, the board receiving portion includes a connector portion near an end portion of the control board, the connector portion electrically connects the control board with a harness leading to an external peripheral equipment, and a distance between the connector portion and the electric motor is longer than a distance between the main circuit and the electric motor.

* * * * *